March 31, 1964

G. R. STUTZMAN 3,126,734

HIGH SPEED HIGH SENSITIVITY LEAK DETECTOR

Filed Sept. 30, 1960

INVENTOR.
GUY R. STUTZMAN
BY
Lockwood, Woodard, Smith & Weikart
ATTORNEYS

March 31, 1964 G. R. STUTZMAN 3,126,734
HIGH SPEED HIGH SENSITIVITY LEAK DETECTOR
Filed Sept. 30, 1960 7 Sheets-Sheet 2

INVENTOR.
Guy R. Stutzman
BY
*Lockwood, Woodard, Smith & Wiekart*
ATTORNEYS

INVENTOR.
Guy R. Stutzman
BY
Lockwood, Woodard, Smith & Weikart
ATTORNEYS

March 31, 1964   G. R. STUTZMAN   3,126,734
HIGH SPEED HIGH SENSITIVITY LEAK DETECTOR
Filed Sept. 30, 1960   7 Sheets-Sheet 6

Fig. 6.

INVENTOR.
Guy R. Stutzman
BY
Lockwood, Woodard, Smith & Weikart
ATTORNEYS

Fig. 8.

United States Patent Office 3,126,734
Patented Mar. 31, 1964

3,126,734
HIGH SPEED HIGH SENSITIVITY LEAK DETECTOR
Guy R. Stutzman, P.O. Box 55, Greenwood, Ind.
Filed Sept. 30, 1960, Ser. No. 59,701
18 Claims. (Cl. 73—40)

This invention is related generally to the inspection of manufactured products, and more particularly to detection of minute leaks in products built to meet a requirement that they be leakproof.

The reliability requirements for components used in missiles and other military equipment are very critical. It is necessary one hundred percent testing be employed. Prior hereto, hermetically sealed enclosures, such as radio tubes and glass-to-metal sealed terminals and headers, have been tested using a helium mass spectrometer leak detector. The helium mass spectrometers require considerable time and though they can detect relatively small leaks, their capability for detection of minute leaks is somewhat limited. Such equipment is not adequate for one hundred percent testing of the large numbers of components required by the government.

It is, therefore, an object of this invention to provide a novel leak detection apparatus.

It is a further object of this invention to provide a leak detection apparatus capable of detection of leaks which are too small to be detected by the helium mass spectrometer.

It is a still further object of this invention to provide a leak detection apparatus capable of testing large numbers of units.

It is a still further object of this invention to provide leak detection apparatus which is completely safe for an otherwise unprotected operator to use.

It is a still further object of this invention to provide leak detection apparatus which an operator can use while in a sitting position.

It is a still further object of this invention to provide leak detection apparatus which is inexpensive to operate and reqiuring a minimal consumption of rare material in its operation.

This invention includes in its scope a console type of test stand having a circular disk-like rotary top plate or member with a plurality of test parts receivers therein. A plurality of hoods corresponding to the receivers, cooperate with the receivers to provide for test chambers to house parts or components to be tested.

The rotary member has a flat lower face which is slidably supported by a flat upper face of a lower stationary plate or member. The rotary member has a group of passageways from each test chamber with connecting ports in the flat lower face. The stationary member has a number of ports and passageways therein. These are arranged in groups or stations for communication with test chambers in a predetermined sequence as the top plate is rotated to move the test chambers into communication with various stations.

There are several test stations at which tests for relatively large leaks are accomplished and one station at which the tests are made to detect minute leaks. A radioactive gas is used to detect minute leaks, and a combination vacuum and pressure pump is used to handle the radioactive gas in a closed circuit and minimize consumption of the gas. Provision is made for safe disposition of the radioactive material which leaves the closed circuit in the event that a leaking test unit is encountered.

The full nature of the invention will be understood from the accompanying drawings and the following description and claims:

Figure 1:
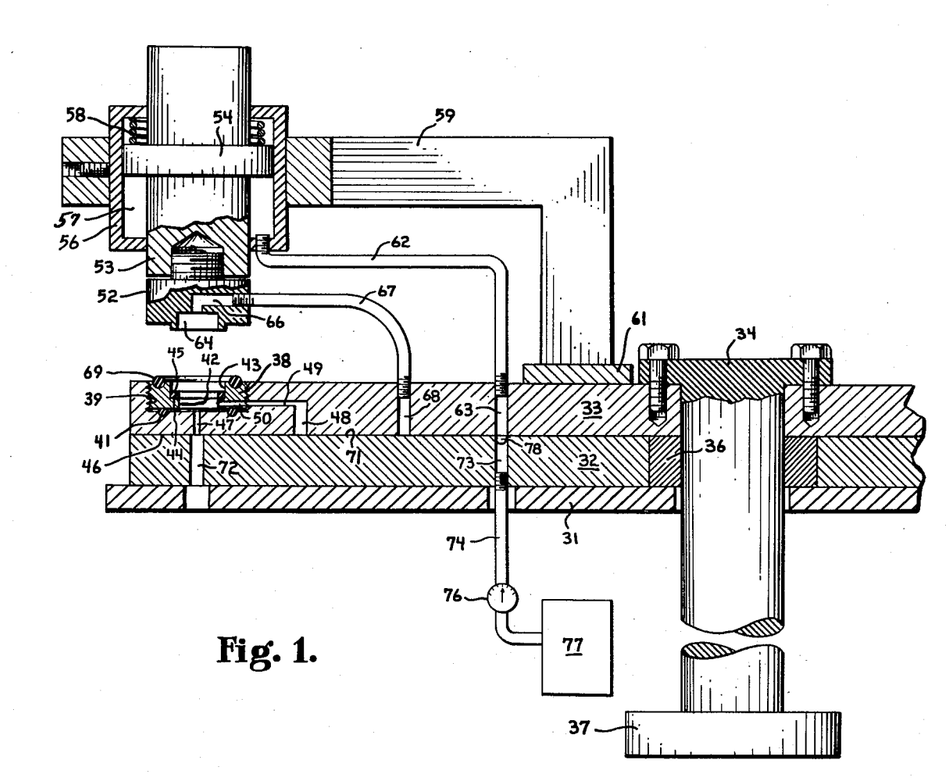
FIG. 1 shows in cross section one of the plurality of test part receivers and its associated hood communicating with the first station which will be described in the detailed description of a typical embodiment of this invention.

Referring to FIG. 1, there is shown a base plate 31 supporting a stationary member 32 which is normally in a circular form. The base plate can, of course, be fastened to the framework of a console or other unit placing it at whatever level is desired. The stationary member 32 supports a rotary member 33 in sliding relation to the stationary member. The rotary member 33 is driven by a shaft 34 which is radially located with respect to the stationary member 32 by means of a bearing 36. The shaft 34 is driven by an indexing mechanism 37 which can rotate the rotary member and stop it in any selected position. The rotary member 33 has a test part receiver 38 which is received in the rotary member 33 by means of the threads 39.

The receiver 38 is sealed at its inside to the rotary member by means of the sealing member 41 which may be an O-ring seal. The test part receiver 38 has a first bore 42 therein and a second and larger bore 43 therein with a step 44 between them supporting a sealing member 45. The sealing member 45 is used to seal the test part (not shown) to the test part receiver during the testing operation. The bore 42 communicates with the underside 46 of the rotary member 33 by means of a passageway 47 through the rotary member. The bore 42 also communicates with the underside 46 of the rotary plate 33 by means of a second aperture 48 connected to the test part receiver by means of the passageways 49 and 50. The passageways 47 and 48 are located on the same radial line with respect to the center of the rotary member, but obviously at different distances from the center.

Positioned directly above the test part receiver is a hood assembly including a hood fixture 52. The hood fixture 52 is threadedly fastened to a ram or piston 53 having a flange 54 which rides in the cylinder 56 and provides a seal so that air supplied to the chamber 57 is capable of driving the piston upwardly. The return spring 58 is provided to maintain the piston in a normally down position. The hood assembly is supported by means of a bracket 59 fastened to the cylinder 56 and fastened to the rotary plate 33 at the base of the bracket 61. A passageway 62 for compressed air, is connected between the cylinder 56 and the rotary plate 33 and communicates with the underside of the rotary plate by means of the passageway 63.

The hood fixture 52 has a recess 64 in the underside thereof which has a passageway 66 connected by means of the flexible tubing 67 to the rotary plate 33. The tube 67 communicates with the underside of the rotary plate 33 by means of a passageway 68.

Though the hood structure is shown in the raised position, its normally closed position provides a chamber for the test part which is sealed from the outside by means of the O-ring sealing member 69.

The underside 46 of the rotary member 33 is very accurately made and matches the upper side 71 of the stationary member 32, providing a rotary seal between the two parts. Accordingly, a passageway in the rotary member which is adjacent to or in registry with a passageway in the stationary member can conduct gas under pressure between the parts without any leakage.

The stationary member 32 has a passageway 72 therethrough which is in registry or indexed with the passageway 47 in the rotary member providing an outlet to atmosphere. A passageway 73 is in registry with a passageway 63 of the rotary member and provides a conduit from the air compressor discharge pipe 74 to the chamber 57 in the hood unit air cylinder 56. A gauge 76 may be provided in the discharge pipe 74 from the air compressor 77 if desired. A circularly progressing semi-circular groove 78 is provided in the surface of the stationary plate 32 communicating with the passageway 73 for purposes as will become apparent as the description proceeds. The passageways 47, 48, 63, and 68 in the rotary member 33 are normally all located on a radial line from the center of the member.

Figure 2:
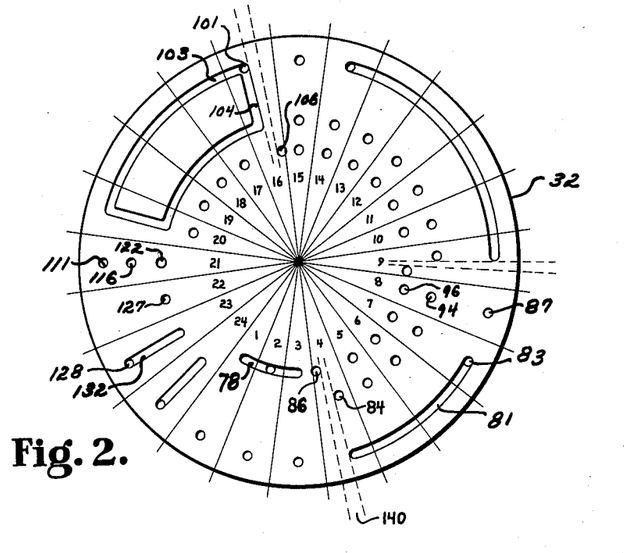
FIG. 2 shows a plan view of the stationary plate incorporated in the embodiment of FIG. 1 and all of the other figures of the drawing.

FIG. 2, showing the plan view of the stationary member 32 of FIG. 1 is, for purposes of illustration, divided into twenty-four sectors which will hereinafter be called stations. Each of the twenty-four stations has a certain number of openings or passageways therein located at predetermined distances both radially and circumferentially to accomplish various purposes as will be described hereinafter.

Figure 3:
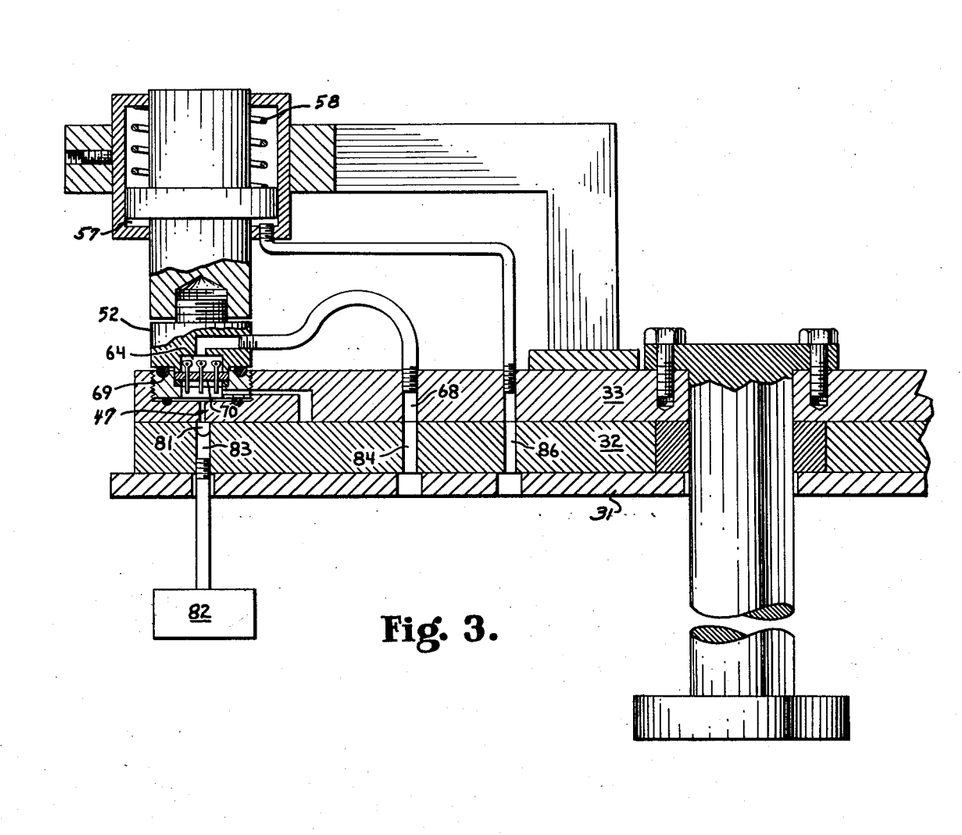
FIG. 3 shows a cross section of the typical embodiment, illustrating characteristics of a number of the stations at which a high vacuum is applied across the test unit.

FIG. 3 shows in cross section the arrangement of the rotary member and the stationary member at stations 4, 5, 6, 7, 9, 10, 11, 12, 13, and 14. At these stations, the hood fixture 52 is in the down or closed position, where it holds a test part 70 in place. In this illustration, the test part is a terminal board having three terminals therein.

At the station represented by FIG. 3, the stationary member 32 has a channel portion 81 in its upper face. The channel portion communicates with a vacuum pump 82 by means of a passageway 83 through the stationary member 32. The channel portion 81 is provided so that a passageway 83 is required at only one station for connection with the vacuum pump 82. An alternate construction could be, for example, to provide a passageway such as 83 at each of the stations, eliminating the channel 81, and connecting each of the passageways 83 at the underside of the base 31 to the vacuum pump 82.

In each of the stations which FIG. 3 represents, there is a passageway 84 through the stationary member, which is open to atmosphere and allows communication with atmosphere of the chamber 64 in the hood fixture 52 above the test part 70. Similarly, there is a passageway 86 through the stationary member which is open to atmosphere and which permits the piston return spring 58 to maintain the hood fixture in the closed position over a test part.

Figure 4:
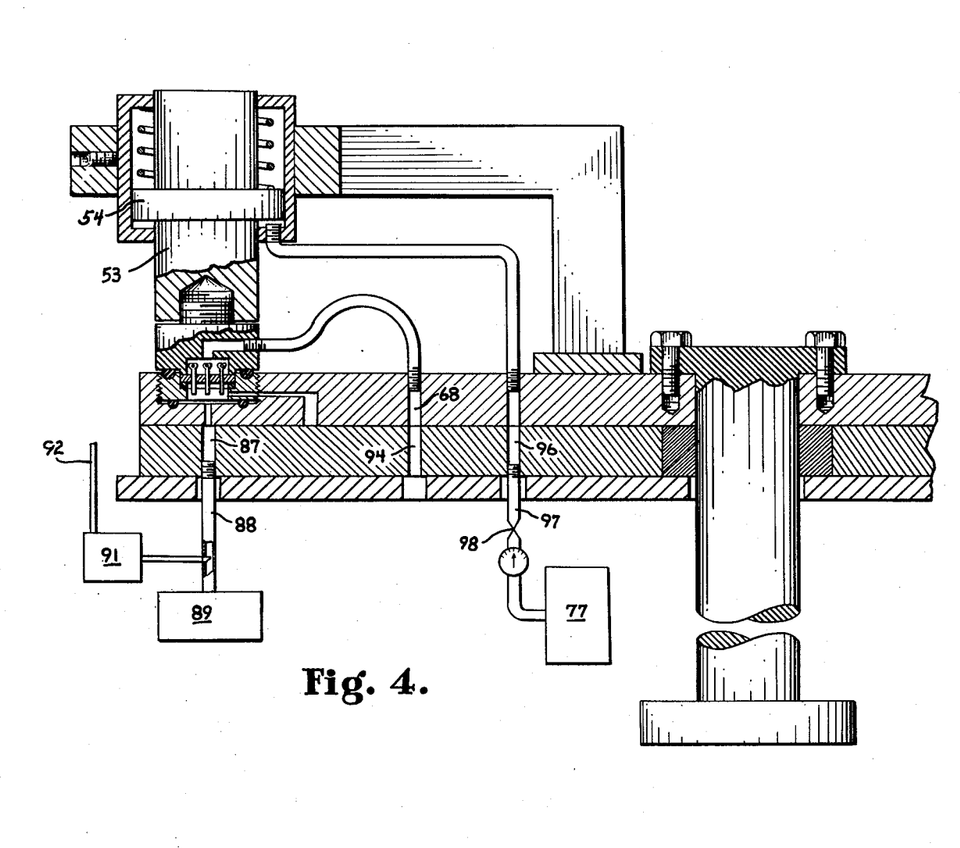
FIG. 4 shows a cross section characteristic of the stations at which tests are made for the larger leaks.

FIG. 4 shows in cross section the arrangement of the passageways in the stationary plate at the stations 8 and 15. There is a passageway 87 through the stationary member which is connected to the conduit 88 which in turn is connected to a vacuum pump 89. A gauge 91 is connected to the conduit 88 to detect the flow, if any, of gas or air through the conduit 88. Typically the gauge 91, may be a Pirani gauge or thermocouple gauge or an ionization gauge. Any suitable recording or registering device may be connected by means of the coupling 92 to the gauge 91 and provides an indication to the operator on the instrument panel of the leakage of a test unit.

A passageway 94 through the stationary member 32 provides an opening to atmosphere from the passageway 68 through the rotary member 33. The passageway 96 through the stationary member is connected to a conduit 97 from air compressor 77, which conduit has a foot or manually operated valve 98 located therein in the normally closed position.

Figure 5:
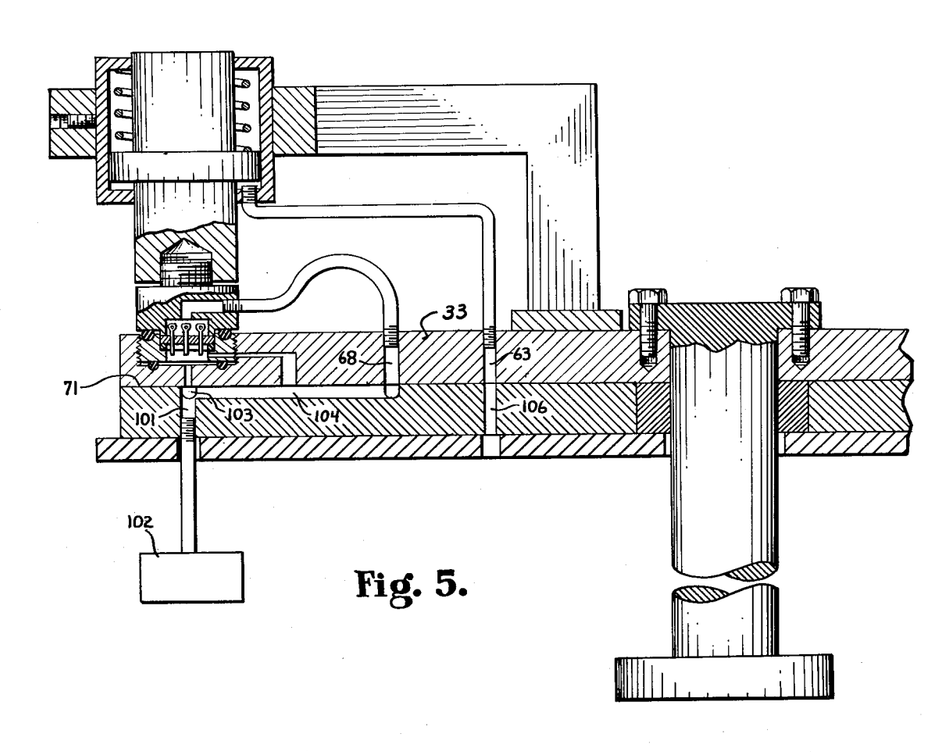
FIG. 5 shows stations which are reached by test chambers in the normal sequence of operations after each testing station at which a test for large leaks is made.

FIG. 5 shows the arrangement of passageways in the stationary plate 32 at the stations 16, 17, 18, 19, and 20. A passageway 101 through the stationary member is connected to a vacuum pump 102. A groove 103 is located at the intersection of the passageway 101 with the upper surface 71 of the stationary member 32 in a manner similar to that of the groove 81 in FIG. 3. A radially extending passageway 104 in the surface of the stationary member connects the vacuum pump to the passageway 68 in the rotary member 33. A passageway 106 to atmosphere is provided for communication with the passageway 63 in the rotary member 33. While this figure is said to be typical of the stations 16 through 20, it is not essential that a separate pump 102 be provided at all of these stations inasmuch as the channels or grooves 103 and 104 obviate the necessity of such construction.

Figure 6:
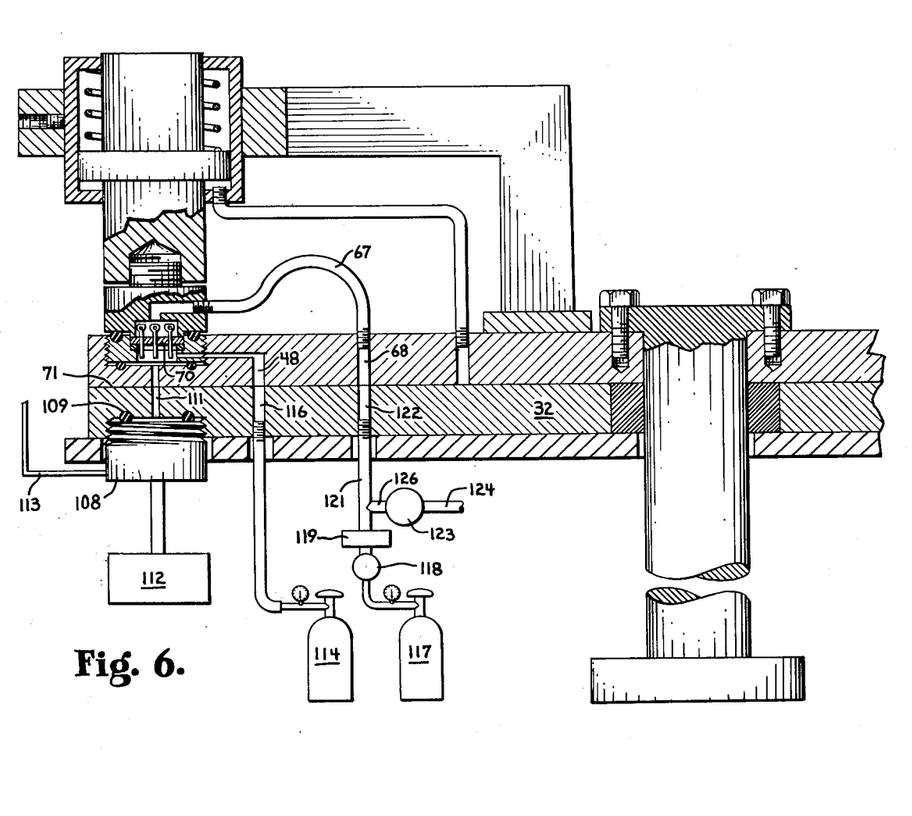
FIG. 6 shows the test station at which a test for minute leaks is made.

FIG. 6 illustrates schematically the portion of the machine associated with station 21. A radioactivity detector 108 is threadedly fastened to the underside of the stationary member 32. The seal, which typically is an O-ring seal 109, seals the detector 108 to the stationary plate 32 so that a gas tight passageway is provided to the detector 108. The passageway 111 communicates between the upper side 71 of the stationary plate and the detector 108. A source of vacuum 112 is connected to the detector to induce a flow, if possible, through the detector from the underside of the test part. An output 113 from the detector 108 provides for visual information at an operator's instrument panel. A controlled source 114 of a gas which may be argon, for example, is connected through the passageway 116 through the stationary plate 32 to the passageway 48 in the rotary plate 33.

A controlled source 117 of a soft emitter of beta rays such as tritium gas, is connected through a valve 118 to a small reserve tank 119. The reserve tank is connected through a conduit 121 to a passageway 122 through the plate 32. The passageway 122 is in registry with the passageway 68 in the rotary plate 33. A vacuum pump 123 having an inlet 124 has an outlet 126 connected to the conduit 121.

Figure 7:
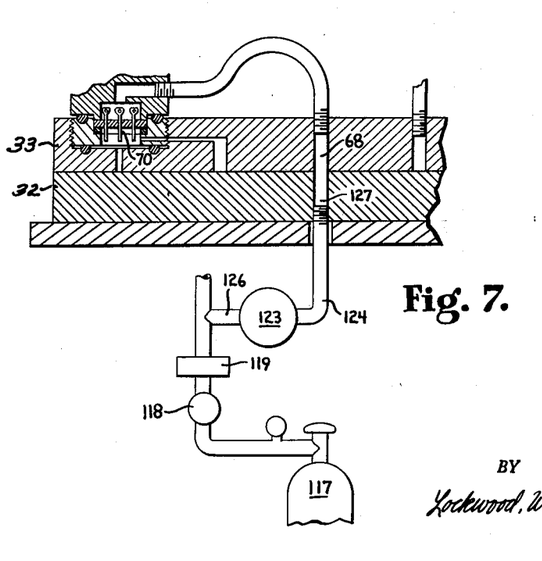
FIG. 7 shows the station at which the salvage of the radioactive test gas is effected.

FIG. 7 is a fragmentary view illustrating station 22 where radioactive gas (tritium) is removed from the hood fixture side of a test part through the passageway 68 in the rotary member 33 which communicates with passageway 127 through the stationary member 32 which is connected in turn to the vacuum pump 123 which is the same as that shown in FIG. 6.

Figure 8:
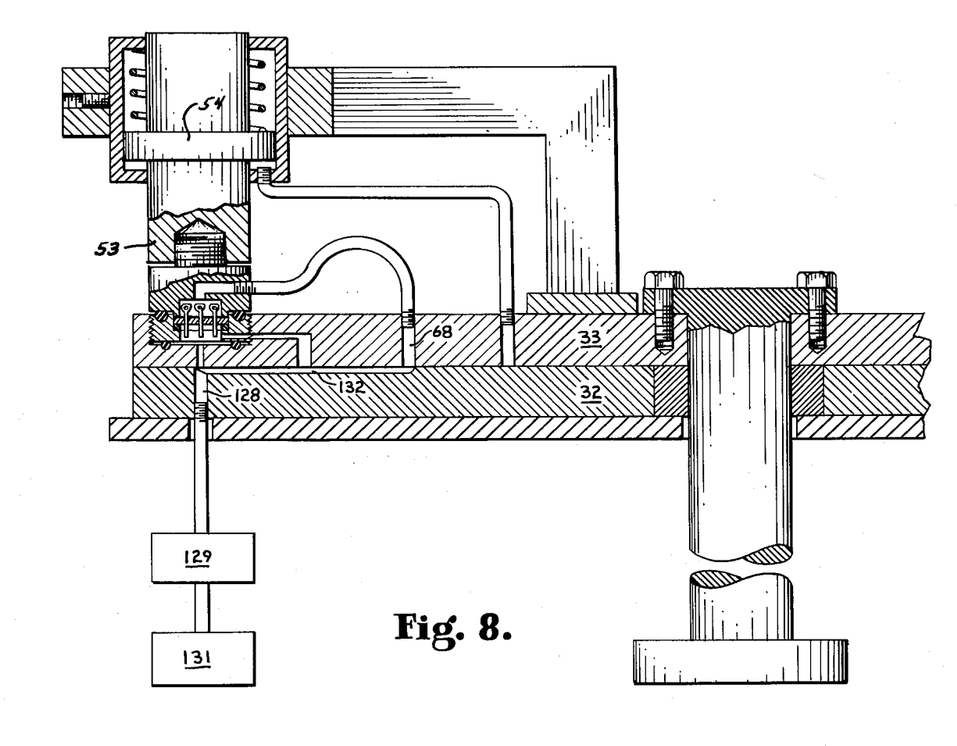
FIG. 8 shows the stations at which the last slight traces of radioactive gas are removed prior to unloading of the test parts.

FIG. 8 shows the stations 23 and 24 where a passageway 128 through the stationary member 32 is connected to a source of vacuum 129 having a discharge to a salvage unit 131 for safe disposition of radioactive waste. Passageway 128 also communicates with the hood fixture side of the test part by means of a radially extending channel or groove 132 which registers at its innermost margin with the passageway 68 through the rotary member 33.

In operation of the invention, compressed air from the compressor 77 of FIG. 1 holds the hood fixture in the raised or open position at staitons 1, 2, and 3 permitting placement of a test part in receiver 38. Upon indexing the rotary member to a station 4, illustrated in FIG. 3, the pressure on the hood fixture piston in chamber 57 is vented to atmosphere through the passageway 68 whereupon the piston return spring 58 moves the hood fixture 52 downwardly to seal against the seal 69 enclosing a test part 70 in position. The vacuum pump 82 of FIG. 3 then removes air from the underside of the test part. As the indexing mechanism 37 moves the rotary member through the positions 5, 6, and 7 from the station 4, the vacuum pump continues to exhaust air from the underside of the test part. It should be noted at this point, that the passageway 86 of station 4 is located slightly ahead of the passageway 84. This permits the hood fixture to close before the passageway 47 of the rotary member 33 at the underside of the test part comes into registry with the source of vacuum 82. This offset is illustrated in FIG. 2 by the referenece numeral 140 which shows a sector between the passageway 86 and the passageway 84. This same method is applied at station 9 and station 16 to accomplish the same purpose of closing the hood fixture before evacuation of the chambers around the test part commences.

When a test unit reaches station 8, illustrated in FIG. 4, the upper side of the test part is open at atmospheric pressure through the passageway 94 in registry with passageway 68 on the stationary and rotary plates, respectively. As the vacuum pump 89 tends to draw air from the underside of the test part, the gauge 91 will detect any significant flow of air so that a unit which leaks at a relatively large rate can be detected. If a leaking unit is encountered at this station, it can be removed by opening the valve 98 to apply air pressure to the underside of the flange 54 of piston 53 to raise the hood fixture, permitting access to remove the test part. The test part can then be replaced by a leakproof dummy unit.

Upon moving the rotary member (assuming no leak was detected at station 8) for communication of the test chamber with station 9, constructed as represented by FIG. 5, evacuation from both the upper and lower side of the test part begins by means of the vacuum pump 102. Evacuation continues as the test part moves from station to station up to station 15. Upon reaching station 15, the part is again tested for leaks in the manner described at station 8. If a leak is detected here, the part can be removed and replaced by a dummy unit in the same manner as explained with respect to station 8.

Assuming no leak is detected at station 15, the test unit progresses around through stations 16, 17, 18, 19, and 20 illustrated in FIG. 5. At these stations both the chambers, above and below the test part are evacuated in preparation for the test for minute leaks to be made at station 21.

When the test part reaches station 21, illustrated in FIG. 6, tritium gas is admitted through the passageways 122 and 68 and the flexible tubing 67 to the upper side of the test part 70. Argon at a controlled rate is admitted through the passageways 116 and 48 to the underside of the test part 70. The controlled rate of admission of the argon, together with the vacuum provided by the vacuum pump 112 in cooperation with the controlled pressure of application of tritium to the upper side of the test part create a pressure drop across the test part. Any leakage of tritium through the test part will be detected by means of the detector 108 which is able to detect beta ray emission from the tritium gas which has leaked through the test part and is carried through the detector by means of the argon from the source 114. If the detection of particles indicates a greater leakage than the specifications permit, the part will be rejected.

After the test is completed at station 21, the test part moves to station 22 illustrated in FIG. 7. At this station, the tritium gas which was pumped to the upper side of the test part 70 is removed by means of the vacuum pump 123. As the gas is drawn out, the vacuum pump 123 discharges it at 126 to the reserve tank 119 which is adequate to store the amount of gas contained in the passageways to the upper side of the test part in the station 21. At the same time this gas can be discharged to the top side of the test part in the next succeeding test part receiver in the rotary member which, at this time, is in position in station 21 for testing for leakage by the radioactive gas. In station 22 practically all of the radioactive gas is salvaged.

Upon further rotation of the rotary member 33 the test part arrives at station 23 whereupon a vacuum pump 129 further exhausts or purges the upper side of the test part and at the same time purges the underside of the test part so that if there was any leakage of radioactive gas to the underside of the test part at station 21, this also would be removed. To safely handle the radioactive gas the vacuum pump discharges to a salvage unit 131 so that no danger is presented to the operator. The purging operation of station 23 is continued when the part moves to station 24 and is completed at this station. Upon rotation of the rotary member to the next station, which is station 1, the hood fixture rises due to the application of compressed air to the underside of the flange 54 of piston 53 from the compressor 77 and the test part can be removed and replaced by a new part for test.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A testing apparatus comprising: test part accommodating means in a first member; operation stations in a second member in communicable relation with accommodating means in said first member; means coupled to one of said members for moving test part accommodating means to communication with selected stations in said second member; fluid handling means coupled to stations and including a pump coupled to at least one station for supplying a fluid to accommodating means communicating with that station, said pump being coupled to at least one other station for withdrawing fluid from accommodating means communicating with said other station simultaneously with the supplying to said accommodating means communicating with said one station.

2. The apparatus of claim 1 wherein said fluid handling means includes a reservoir.

3. The apparatus of claim 1 wherein said fluid handling means includes a controlled source of radioactive fluid.

4. A testing apparatus comprising: a stationary member and a movable member having surfaces in sliding engagement with each other, one of said members having means providing test chambers for test parts and the other having operation stations therein; passageways intersecting the engaging surfaces of said members providing a communicable relation between test chambers and said stations; means to selectively position said movable member with respect to said stationary member, various positions of said movable member with respect to said stationary member effecting registry of passageways in said stationary member with passageways in said movable member in predetermined order, said slidingly engaging surfaces sealing against each other providing leak-proof passageways between said stationary member and said movable member at locations of registry; fluid supply and exhaust units coupled to selected passageways in said members with at least one of said stations having means for providing a pressure differential across a test part in a test chamber communicating with said station, said means including a source of fluid for leak detection coupled to the high pressure side of a test part, and an adjacent station having means for providing a pressure differential across a test part in a test chamber communicating with said adjacent station in the opposite direction to the pressure differential at said one station, said means to provide pressure differentials being coupled to provide a closed circuit including the test chambers communicating with said one station and said adjacent station to conserve said fluid for leak detection.

5. A testing apparatus comprising: a stationary member and a movable member having surfaces in sliding engagement with each other, one of said members having means providing test chambers for test parts and the other having operation stations therein; passageways intersecting the engaging surfaces of said members providing a communicable relation between test chambers and said stations; means to selectively position said movable member with respect to said stationary member, various positions of said movable member with respect to said stationary member effecting registry of passageways in said stationary member with passageways in said movable member in predetermined order, said slidingly engaging surfaces sealing against each other providing leak-proof passageways between said stationary member and said movable member at locations of registry; fluid supply, exhaust and venting units coupled to selected passageways in said members, with a first one of said stations having means for applying a pressure differential across a test part in a test chamber communicating with said station and having a flow detector coupled to the low pressure side of a test part in said communicating chamber to detect leaks through said test part, and a second one of said stations having means for applying a pressure differential across a test part in a test chamber communicating with said station, said second station including a source of radioactive fluid coupled to the high pressure side of a test part, and further including a source of vacuum coupled to the low pressure side of the test part, and further including a source of fluid coupled to the low pressure side controllably admitting fluid to the low pressure side to carry toward the source of vacuum any fluid leaking from the high pressure side into the low pressure side, and further including a radioactivity detector coupled to the said low pressure side to detect minute leaks through the test part, and a third station between said second station and said first station and having means for evacuating a test chamber communicating with said third station whereby chambers wherein leaking test parts are discovered upon communication with said first station and replaced with non-leaking units are evacuable prior to a positioning of said movable member with respect to said stationary member which effects communication of said chambers with said third station.

6. A testing apparatus comprising: a first and second member, each having a surface in sliding engagement with a corresponding surface of the other; a test part receiver in said first member; a hood unit positionable in sealed relationship with said test part receiver to form an enclosure; means for sealing a test part in said enclosure to form a first and second chamber on opposite sides of a test part in position; means for communication between the first chamber and a first and second separate port intersecting the engaging surface of said first member; means for communication between the second chamber and a third port intersecting the engaging surface of said first member; a plurality of groups of passages in the engaging surface of said second member, said groups being arranged in said second member for communication of passages with ports in said first member in predetermined fashion in various relative positions of said first member with respect to said second member, a first group including a passageway in said second member to atmosphere; a second group including a passageway in said second member communicable with said first port and connected to a source of vacuum, and a passageway in said second member to atmosphere, said second group being for evacuation of the first chamber; a third group including a passageway in said second member communicable with said third port and connected to a source of vacuum and a leak detector, and a passageway in said second member communicable with said third port and connected to atmosphere, said third group being for detecting leaks and accommodating removal of a leaking test unit and replacement; a fourth group like said second group; a fifth group like said third group; a sixth group comprising a pair of passageways in said second member communicable with said first and third ports and communicating with a source of vacuum for the purging of air from both said chambers; a seventh group comprising a passageway in said second member communicable with said second port and connected to a controlled source of gas, a passageway in said second member communicable with said third port and connected to a controlled source of a radioactive gas, and a passageway in said second member communicable with said first port and connected to a radioactivity detector to test for leakage of radioactive gas; an eighth group including a passageway in said second member communicable with said third port and communicating with a vacuum generator discharging to said controlled source of radioactive gas; and a ninth group including passageways in said second member communicable with said first and third ports and communicating with a source of vacuum for purging radioactive gas from said chambers and making safe disposal of said gas.

7. A testing apparatus comprising: a first and second member, each having a surface in sliding engagement with a corresponding surface of the other; a test part receiver in said first member; a hood unit positionable in sealed relationship with said test part receiver to form an enclosure; means for sealing a test part in said enclosure to form a first and second chamber on opposite sides of a test part in position; means for communication between the first chamber and a first and second separate port intersecting the engaging surface of said first member; means for communication between the second chamber and a third port intersecting the said engaging surface of said first member; a plurality of groups of passages in the engaging surface of said second member, said groups being arranged in said second member for communication of passages with ports in said first member in predetermined fashion in various relative positions of said first member with respect to said second member, a first group including a passageway in said second member to atmosphere; a second group including a passageway in said second member communicable with said first port and connected to a source of vacuum, and a passageway in said second member to atmosphere, said second group being for evacuation of the first chamber; a third group including a passageway in said second member communicable with said first port and connected to a source of vacuum and leakage detector, and a passageway in said second member communicable with said third port and connected to atmosphere, said third group being for detecting relatively large leaks and accommodating removal of a leaking test unit and replacement by a leakproof unit; a fourth group comprising a pair of passageways in said second member communicable with said first and third ports and communicating with a source of vacuum for purging air from both said chambers; a fifth group comprising a passageway in said second member communicable with said second port and connected to a controlled source of gas, a passageway in said second member communicable with said third port and connected to a controlled source of a radioactive gas, and a passageway in said second member communicable with said first port and connected to a radioactivity detector to test for leakage of radioactive gas; a sixth group including a passageway in said second member communicable with said third port and communicating with a vacuum generator discharging to said controlled source of radioactive gas; and a seventh group including passageways in said second member communicable with said first and third ports and communicating with a source of vacuum for purging radioactive gas from said chambers and safely disposing of said radioactive gas.

8. A testing apparatus comprising: a first and second member, at least one of which being movable about an axis, each having a flat surface in sliding engagement with the flat surface of the other; a test part receiver in said first member; a hood unit positionable in sealed relationship with said test part receiver to form an enclosure; means for sealing a test part in said enclosure to form a first and second chamber on opposite sides of a test part in position; means for communication between the first chamber and a first and second separate port intersecting the flat surface of said first member; means for communication between the second chamber and a third port intersecting the flat surface of said first member; a plurality of groups of passages in the flat surface of said second member, said groups being arranged in sectors about said axis for communication of passages with ports in predetermined fashion in various relative positions of said first member with respect to said second member, a first group including a passage in said second member to atmosphere; a second group including a passageway in said second member communicable with said first port and connected to a source of vacuum, and a passageway in said second member to atmosphere, said second group being for evacuation of the first chamber; a third group including a passage in said second member communicable with said third port and connected to a source of vacuum and leakage detecting means, and a passageway in said second member communicable with said third port and connected to atmosphere, said third group being for detecting large leaks and accommodating removal of a leaking test unit and replacement by a leakproof unit; a fourth group comprising a pair of passageways in said second member communicable with said second and third ports and communicating with a source of vacuum for purging air from both said chambers; a fifth group comprising a passage in said second member communicable with said second port and connected to a controlled source of gas, a passageway in said second member communicable with said third port and connected through a reserve tank to a controlled source of a radioactive gas, and a passageway in said second member communicable with said first port and connected to a radioactivity detector to test for leakage of radioactive gas; a sixth group including a passageway in said second member communicable with said third port and communicating with a vacuum generator discharging to said reserve tank for removing radioactive gas from the second chamber and storing it temporarily in said reserve tank; and a seventh group including passageways in said second member communicable with said second and third ports and communicating with a source of vacuum for purging radioactive gas from said chambers and safely disposing of said radioactive gas.

9. A testing apparatus comprising: a first and second member, at least one of which is movable about an axis, each having a flat surface in sliding engagement with the flat surface of the other; a test part receiver in said first member; a hood unit having driving means operable by fluid pressure and positionable in sealed relationship with said test part receiver to form an enclosure; means for sealing a test part in said enclosure to form a first and second chamber on opposite sides of a test part in position; means for communication between the first chamber and first and second separate ports intersecting the flat surface of said first member; means for communication between the second chamber and a third port intersecting the flat surface of said first member; means for communication of fluid between said hood unit driving means and a fourth port intersecting the flat surface of said first member; a plurality of groups of passageways intersecting the flat surface of said second member, said groups being arranged in sectors about said axis for communication of passageways with ports of said first member in predetermined manner in various relative positions of said first member with respect to said second member, a first group including a passageway in said second member communicable with said first port and opening to atmosphere and a passageway in said member communicable with said fourth port and connected to a source of fluid under pressure; a second group including a passageway in said second member communicable with said first port and connected to a source of vacuum, and a passageway in said second member to atmosphere, said second group being for evacuation of the first chamber; a third group including a passageway in said second member communicable with said first port and connected to a source of vacuum and leakage indicating means and a passageway in said second member communicable with said third port and connected to atmosphere, and a passageway in said second member communicable with said fourth port and connected to a controllable source of fluid under pressure, said third group being for detecting large leaks and accommodating removal of a leaking test unit and replacement by a leakproof unit; a fourth group comprising a pair of passageways in said second member communicable with said first and third ports and communicating with a source of vacuum, and a passageway to atmosphere in said second member, said fourth group providing for the purging of air from both said chambers; a fifth group comprising a passageway in said second member communicable with said second port and connected to a controlled source of gas under pressure, a passageway in said second member communicable with said third port and connected through a reserve tank to a controlled source of radioactive gas, and a passageway in said second member communicable with said first port and connected to a radioactivity detector to test for leakage of radioactive gas; a sixth group including a passageway in said second member communicable with said third port and communicating with a vacuum generator discharging to said reserve tank for removing radioactive gas from the second chamber and storing it temporarily in said reserve tank; and a seventh group including passageways in said second member communicable with said first, second and third ports and communicating with a source of vacuum for purging radioactive gas from said chambers and safely disposing of said radioactive gas.

10. A testing apparatus comprising: a first and second member, at least one of which is movable about an axis, each having a flat surface in sliding engagement with the flat surface of the other; a test part receiver in said first member; a hood unit having driving means operable by fluid pressure and positionable in sealed relationship with said test part receiver to form an enclosure; means for sealing a test part in said enclosure to form a first and second chamber on opposite sides of a test part in position; means for communication between the first chamber and first and second separate ports intersecting the flat surface of said first member; means for communication between the second chamber and a third port intersecting the flat surface of said first member; means for communication of fluid between said hood unit driving means and a fourth port intersecting the flat surface of said first member; a plurality of groups of passageways intersecting the flat surface of said second member, said groups being arranged in sectors about said axis for communication of passageways with ports in said first member in predetermined manner in various relative positions of said first member with respect to said second member, a first group including a passageway in said second member communicable with said first port and opening to atmosphere and a passageway in said member communicable with said first port and connected to a source of fluid under pressure; a second group including a passageway in said second member communicable with said first port and connected to a source of vacuum, and a passageway in said second member to atmosphere, said second group being for evacuation of the first chamber; a third group including a passageway in said second member communicable with said first port and connected to a source of vacuum and leakage indicating means and a passageway in said second member communicable with said third port and connected to atmosphere and a passageway in said second member communicable with said fourth port and connected to a controllable source of fluid under pressure, said third group being for detecting large leaks and accommodating removal of a leaking test unit and replacement by a leakproof unit; a fourth group like said second group; a fifth group like said third group; a sixth group comprising a pair of passageways in said second member communicable with said first, second and third ports and communicating with a source of vacuum and a passageway to atmosphere in said second member, said sixth group being for purging air from both said chambers; a seventh group comprising a passageway in said second member communicable with said second port and connected to a controlled source of gas under pressure, a passageway in said second member communicable with said third port and connected through a reserve tank to a controlled source of radioactive gas, and a passageway in said second member communicable with said first port and connected to a radioactivity detector to test for leakage of radioactive gas; an eighth group including a passageway in said second member communicable with said third port and communicating with a vacuum generator discharging to said reserve tank for removing radioactive gas from the second chamber and storing it temporarily in said reserve tank; and a ninth group including passageways in said second member communicable with said first, second and third ports and communicating with a source of vacuum for purging radioactive gas from said chambers and safely disposing of said radioactive gas.

11. A testing apparatus comprising: a first and second member relatively movable about an axis, each having a flat surface in sliding engagement with the flat surface of the other; a test part receiver in said first member; a movable hood unit driveable by a fluid pressure operable actuator and positionable in sealed relationship with said test part receiver to form an enclosure; means for sealing a test part in said enclosure to form a first and second chamber on opposite sides of a test part in position; means for communication between the first chamber and first and second separate ports intersecting the flat surface of said first member; means for communication between the second chamber and a third port intersecting the flat surface of said first member; means for communication of fluid between said hood unit and a fourth port intersecting the flat surface of said first member; a plurality of groups of openings in the flat surface of said second member, said groups being arranged in sectors about said axis, a first group including an opening in said second member communicating with the atmosphere and an opening in said member communicating with a source of fluid under pressure; a second group including a passageway in said second member to a first source of vacuum, a pair of passageways in said second member to atmosphere, said second group being for evacuation of the first chamber; a third group including a passageway in said second member connected to a second source of vacuum, a leak detector, a passageway in said second member communicating with the atmosphere, and a passageway in said second member connected to a controllable source of fluid under pressure, said third group being for detecting large leaks and accommodating removal of a leaking test unit and replacement by a leakproof dummy unit; a fourth group like said second group; a fifth group like said third group; a sixth group comprising a pair of passageways in said second member communicating with a third source of vacuum, and a separate passage to atmosphere in said second member, said sixth group providing for the purging of air from both said chambers; a seventh group comprising a passageway in said second member connected to a controlled source of inert gas under pressure, a passageway in said second member connected through a reserve tank to a controlled source of radioactive gas, and a passageway in said second member connected to a radioactivity detector to test for leakage of radioactive gas; an eighth group including a passageway in said second member communicating with a fifth source of vacuum having discharge means coupled to said reserve tank for removing radioactive gas from the second chamber and storing it temporarily in said reserve tank; and a ninth group including passageways in said second member communicating with a fourth source of vacuum connected to a salvage unit for purging radioactive gas from said chambers and making safe disposal of said gas, the opening in said first group communicating with the atmosphere being communicable with said first port and the opening communicating with the source of air under pressure being simultaneously communicable with said fourth port; the passageway of said second group to a first source of vacuum being communicable with said first port and the pair of passageways to atmosphere being communicable with said third and fourth ports; the passageway in the third group at the second source of vacuum being communicable with said first port, the passageway communicating with atmosphere being communicable with said third port, and the passageway connected to a controllable source being communicable with said fourth port; the pair of passageways in said sixth group being communicable with said first, second, and third ports; the passageway in said seventh group, to a controlled source of inert gas being communicable with said second port, the passageway connected through a reserve tank being communicable with said third port, and the passageway connected to a radioactivity detector being communicable with said first port; the passageway in said eighth group being communicable with said third port; and the passageways in said ninth group being communicable with said first, second and third ports.

12. The testing apparatus of claim 11 wherein one passageway of said second, fourth and sixth groups communicable with said fourth ports, is offset from a radial line from the axis of said second member and extending through the intersection between the passageway to a source of vacuum and the flat surface of said second member, the offset being in the direction toward the last preceding group of passageways.

13. The testing apparatus of claim 11 wherein the leak detectors in said third group and said fifth group employ gas flow detecting units communicating with the connection between the passage in the second plate and the source of vacuum.

14. The testing apparatus of claim 13 wherein the flow detecting unit includes a current carrying element in the gas flow path.

15. A leak detector comprising: a first and second member relatively movable about an axis, each having a flat surface in sliding engagement with the flat surface of the other; a test part receiver in said first member; a movable hood unit driveable by a fluid pressure operable actuator and positionable in sealed relationship with said test part receiver to form an enclosure; means for sealing a test part in said enclosure to form a first and second chamber on opposite sides of a test part in position; means for communication between the first chamber and a first and second separate port intersecting the flat surface of said first member; means for communication between the second chamber and a third port intersecting the flat surface of said first member; means for communication of fluid between said hood unit and a fourth port intersecting the flat surface of said first member; a plurality of groups of openings in the flat surface of said second member, said groups being arranged in sectors about said axis for communication with ports of said first member in predetermined fashion upon rotation of said first member with respect to said second member to relationship of index, a first group including an opening communicable with said first port and extending through said second member to atmosphere and an opening communicable with said fourth port and extending through said member to a source of fluid under pressure for opening said hood unit to accommodate removal and installation of test units; a second group including a passageway in said second member communicable with said first port and connected to a first source of vacuum, a pair of passageways in said second member communicable with said third and fourth ports and opening to atmosphere, said second group being for evacuation of the first chamber; a third group including a passageway in said second member communicable with said first port and connected to a second source of vacuum and a leak detector, a passageway in said second member communicable with said third port and connected to atmosphere, and a passageway in said second member communicable with said fourth port and connected to a controllable source of fluid under pressure, said third group being for detecting large leaks and accommodating removal of a leaking test unit and replacement by a leakproof dummy unit; a fourth group like said second group; a fifth group like said third group; a sixth group comprising a pair of passageways in said second member communicable with said first, second and third ports and communicating with a third source of vacuum, and a separate passageway communicable with said fourth port and opening to atmosphere through said second member, said sixth group providing for the purging of air from both said chambers; a seventh group comprising an opening through said second plate communicable with said third port and connected to a controlled source of inert gas under pressure, an opening through said second member communicable with said third port and connected through a reserve tank to a controlled source of a light radioactive gas, and an opening through said second member communicable with said first port and connected to a radioactivity detector including a counter coupled to a meter to test for leakage of radioactive gas; an eighth group including an opening in said second member communicable with said third port and communicating with a fifth source of vacuum having discharge means coupled to said reserve tank for removing radioactive gas from the second chamber and storing it temporarily in said reserve tank; and a ninth group including pasageways in said second member communicable wtih said first, second and third ports and communicating with a fourth source of vacuum connected to a salvage unit for purging radioactive gas from said chamber and making safe disposal of said gas.

16. A testing apparatus comprising: first and second members, each having a surface in sliding engagement with a corresponding surface of the other; a test part enclosure in said first member; means for sealing a test part in said enclosure to form first and second chambers on opposite sides of a test part in position; means for communication between the first chamber and a first port intersecting the sliding surface of said first member; means for communication between the second chamber and a second port intersecting the sliding surface of said first member; a plurality of groups of passageways intersecting said sliding surface of said second member, said groups being arranged in said second member for communication of passageways with ports of said first member in predetermined manner in various relative positions of said first member with respect to said second member, a first group including a passageway in said second member communicable with said first port and connected to a source of vacuum, for evacuation of the first chamber; a second group including a passageway in said second member communicable with said first port and connected to a source of vacuum and leakage indicating means for detecting large leaks; a third group comprisnig pasageways in said second member communicable with said first and second ports and communicating with a source of vacuum, for the purging of air from both said chambers; and a fourth group comprising a passageway in said second member communicable with said second port and connected to a controlled source of a radioactive gas, and a passageway in said second member communicable with said first port and connected to a radioactivity detector to test for leakage of radioactive gas from said second chamber to said first chamber through a test part.

17. A testing apparatus comprising: first and second members, each having a surface in sliding engagement with a corresponding surface of the other; test part enclosures in said first member; means for sealing a test part in each of said enclosures to form first and second chambers on opposite sides of a test part in position; means for communication between the first chamber and a first port intersecting the sliding surface of said first member; means for communication between the second chamber and a second port intersecting the sliding surface of said first member; a plurality of groups of passageways intersecting said sliding surface of said second member, said groups being arranged in said second member for communication of passageways with ports of said first member in predetermined manner in various relative positions of said first member with respect to said second member, a first group including a passageway in said second member communicable with said first port and connected to a source of vacuum, for evacuation of the first chamber; a second group including a passageway in said second member communicable with said first port and connected to a source of vacuum and leakage indicating means for detecting large leaks; a third group comprising passageways in said second member communicable with said first and second ports and communicating with a source of vacuum, for the purging of air from both said chambers; a fourth group comprising a first passageway in said second member communicable with said second port and connected to a controlled source of a radioactive gas, and a second passageway in said second member communicable with said first port and connected to a radioactivity detector to test for leakage of radioactive gas; and a fifth group having a passageway communicable with said second port and connected to the inlet of a vacuum generator having a discharge communicating with said first passageway in said fourth group to remove radioactive gas from a test chamber communicating with said fifth group and supply said removed gas to a test chamber communicating with said fourth group.

18. A testing apparatus comprising: first and second members, each having a surface in sliding engagement with a corresponding surface of the other; a test part enclosure in said first member; means for sealing a test part in said enclosure to form first and second chambers on opposite sides of a test part in position; means for communication between the first chamber and a first port intersecting the sliding surface of said first member; means for communication between the second chamber and a second port intersecting the sliding surface of said first member, a plurality of groups of passageways intersecting said sliding surface of said second member, said groups being arranged in said second member for communication of passageways with ports of said first member in predetermined manner in various relative positions of said first member with respect to said second member, a first group including a passageway in said second member communicable with said first port and connected to a source of vacuum, for evacuation of the first chamber; a second group including a passageway in said second member communicable with said first port and connected to a source of vacuum and leakage indicating means for detecting large leaks; a third group comprising passageways in said second member communicable with said first and second ports and communicating with a source of vacuum, for the purging of air from both said chambers; and a fourth group comprising a passageway in said second member communicable with said second port and connected to a controlled source of a radioactive gas, and a passageway in said second member communicable with said first port and connected to a radioactivity detector to test for leakage of radioactive gas; and a fifth group having passageways communicable with said first and second ports and connected to a source of vacuum for purging radioactive gas from said chambers prior to removal of a test port from its said enclosure.

References Cited in the file of this patent

UNITED STATES PATENTS

| | | |
|---|---|---|
| 2,086,116 | Burns | July 6, 1937 |
| 2,387,743 | Cameron et al. | Oct. 30, 1945 |
| 2,844,735 | Creutz et al. | July 22, 1958 |
| 2,936,611 | LeMat et al. | May 17, 1960 |
| 2,999,162 | Pearon | Sept. 5, 1961 |